UNITED STATES PATENT OFFICE.

JACOB F. ST. JOHN, OF ROANOKE, VIRGINIA.

ARTIFICIAL-STONE COMPOSITION.

SPECIFICATION forming part of Letters Patent No. 452,037, dated May 12, 1891.

Application filed February 24, 1891. Serial No. 382,605. (No specimens.)

*To all whom it may concern:*

Be it known that I, JACOB F. ST. JOHN, a citizen of the United States, residing at Roanoke, in the county of Roanoke and State of Virginia, have invented certain new and useful Improvements in Artificial-Stone Compositions; and I do hereby declare that the following is a full, clear, and exact description of the invention, which will enable others skilled in the art to which it appertains to make and use the same.

This invention relates to artificial-stone compositions; and it has for its object to provide a simple and improved composition which will possess advantages in point of inexpensiveness, durability, and general efficiency, and which may be used in the construction of sidewalks, cellar-bottoms, walls, building-stone, ornamental work, and the like, which can be molded into blocks for use in building, for house-trimmings, yard-decorations, and curbing, and which will produce an artificial stone adapted practically to all the various uses to which natural stone is usually applied.

My improved artificial-stone composition consists of the following ingredients, combined substantially in the manner and in about the proportions hereinafter set forth: limestone, pulverized or granulated to a dust; sandstone, pulverized or granulated to a dust; best imported Portland cement, and a solution composed of common lime dissolved with water and sulphuric acid.

In compounding my improved composition, substantially the following proportions and method are observed: To forty (40) gallons of water are added eight (8) quarts or one (1) peck of lime, and the latter is permitted to dissolve. One (1) quart of sulphuric acid is then added to the solution of lime and water, and the whole solution is thoroughly mixed by agitation or in any other adapted manner, and is then permitted to set for about two (2) hours. The solution or liquid is then drawn off, and is ready for use in connection with the other ingredients employed in the manufacture of my improved artificial stone. To one (1) part of the pulverized or granulated limestone-dust are added one (1) part of the pulverized or granulated sandstone-dust and one (1) part best imported Portland cement. These ingredients are thoroughly intermixed by agitation or in any other adapted manner, and to complete the composition the above-described solution is then added in proper relative proportion until the whole mass becomes wet and sufficiently plastic to be properly worked in the desired form and manner.

The manner of using the composition in the construction of sidewalks, driveways, cellar-bottoms, or the like is substantially as follows: Granulated limestone of suitable size (say not more than one and one-half inch cube) is first laid dry to form a suitable foundation of proper thickness, (say from four to six inches thick.) This dry foundation or base is then well rammed or rolled until is is solidly set, as required. Strips of wood or iron or other suitable material are then placed to divide up the surface or space into sections of the desired area, (for instance, five or six feet wide by ten or twelve feet long, more or less, as circumstances may require.) My improved artificial-stone composition is then employed and set in the following manner: One part pulverized or granulated limestone, one part pulverized or granulated sandstone, and one part best imported Portland cement are first mixed thoroughly together in a dry state and the solution composed of lime dissolved in water and sulpuric acid is then added with a spray or sprinkling device until the composition is sufficiently moistened or wet and rendered plastic enough to be easily worked. The improved plastic composition thus formed is then placed in the sections and well rammed or rolled to form a solid mass of proper thickness, preferably four to five inches thick. One part pulverized limestone-dust, one part pulverized sandstone-dust, and one part Portland cement are then mixed well together in a dry state and the solution or liquid above described is then added in sufficient quantity to convert the composition into a good wet mortar, which can be readily spread with a trowel or other suitable tool. This mortar coat or layer of the composition is then set or spread evenly over the surface of the second or heavier layer and the work is now ready to receive a "flinting process," which finishes it. To thus finish, pulverized limestone prepared in a dry state and reduced to a dust or powder is treated with the above-described solution or liquid until it is properly wet. The wet or plastic mass thus formed is then dried by artificial or solar heat, and after it is perfectly dry the mass is reground until it is about as fine as cement. One part of this reground mass is then added to one part cement and distributed evenly by means of a sieve or other suitable device over the last finished top layer or coat of the work and finally smoothed or finished with a trowel or other suitable tool. This last step in the preparation of artificial stone-work of the class above set forth, which I term the "flinting" or "hydrolizing" process, imparts to the surface of the artificial stone a gloss and finish as hard as flint. When the composition is thoroughly dry, the stone is ready for use.

The solution composed of lime dissolved with water and sulphuric acid is one of the most essential elements in my improved artificial-stone composition, and in its action upon the cement, sandstone, and stone-dust it has the neutralizing property or function of keeping the cement from "setting" too rapidly, thereby enhancing the durability of the artificial stone and insuring or rendering the composition as hard as flint when it finally "sets." The action of the solution in relation to the other elements also prevents cracking, warping, or fissures in the artificial stone and secures increased hardness, and consequently greater durability.

It will be understood that the manner of using my improved composition, as above described, relates entirely to its employment in the construction of sidewalks, driveways, and similar flat wearing-surfaces; but that in the construction of building-stone, ornamental work, trimmings, decorations, curbing, and the like the composition will be molded in suitable molds and afterward set in the same manner as natural or cut stone.

The molds and the processes of forming my artificial-stone composition into set stone-work or into movable stone are not herein specifically set forth or described, the same forming no part of my present application for patent, which relates to the composition *per se*, and the molds and processes are embodied in separate applications for Letters Patent.

It is manifest that certain modifications in the condition of the materials and in the quality and character of cement employed may be made without departing from the spirit and scope of my invention. For instance, the degree to which the limestone and sandstone are granulated or pulverized may be varied, and in some classes of work it is not necessary that these elements be reduced to a dust or powder. In like manner, while I prefer to use the best imported Portland cement, other grades or qualities of Portland cement may be effectively employed, or a different cement may even be used; also, while approximately the relative proportions herein set forth are preferably employed under ordinary conditions and circumstances, suitable variations may be made in the proportions according to the nature of the work and the circumstances under which it is constructed. I therefore do not limit myself to the precise quality of the ingredients and proportions herein set forth, but reserve the right to all such variations and modifications as properly fall within the spirit and scope of my invention.

The advantages of my invention will be readily understood by those skilled in the art to which it appertains. By the employment of the above-described ingredients, when properly compounded, in connection with the mixing solution composed of lime dissolved with water and sulphuric acid, a superior artificial stone of enhanced durability and efficiency and a degree of compactness and hardness equal to flint is produced; and the mixing solution not only prevents the cement from setting too rapidly, but also obviates the too rapid drying out of the newly-prepared stone and secures its hardening and drying gradually and by proper degrees, whereby the strength and durability of the completed work is greatly enhanced and the stone is prevented from disintegrating, cracking, or breaking in the process of drying and setting, and under ordinary usage.

I claim as my invention and desire to secure by Letters Patent of the United States—

The herein-described improved artificial-stone composition or mixture comprising granulated or pulverized limestone, (carbonate of lime,) granulated or pulverized sandstone, Portland cement, common lime, sulphuric acid, and water, the said ingredients being intermixed in substantially the manner and proportions set forth.

In testimony whereof I affix my signature in presence of two witnesses.

JACOB F. ST. JOHN.

Witnesses:
J. R. LITTELL,
WM. J. LITTELL.